United States Patent
Khalid et al.

(10) Patent No.: US 9,937,835 B1
(45) Date of Patent: Apr. 10, 2018

(54) COLLAPSIBLE CAR SEATS TO INCREASE CARGO SPACE AND FLEXIBILITY

(71) Applicant: Ford Global Technologies, LLC, Dearborn, MI (US)

(72) Inventors: Umer Khalid, Farmington Hills, MI (US); Mohannad Hakeem, Dearborn, MI (US); John Wayne Jaranson, Dearborn, MI (US); Murtatha Zalzala, Dearborn, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/289,306

(22) Filed: Oct. 10, 2016

(51) Int. Cl.
| | |
|---|---|
| *B60N 2/02* | (2006.01) |
| *B60N 2/64* | (2006.01) |
| *B60N 2/22* | (2006.01) |
| *B60N 2/58* | (2006.01) |
| *B60N 2/01* | (2006.01) |
| *B60N 2/66* | (2006.01) |

(52) U.S. Cl.
CPC .............. *B60N 2/643* (2013.01); *B60N 2/01* (2013.01); *B60N 2/22* (2013.01); *B60N 2/58* (2013.01); *B60N 2/66* (2013.01)

(58) Field of Classification Search
CPC . B60N 2/643; B60N 2/22; B60N 2/58; B60N 2/01; B60N 2/06
USPC ........... 297/284.2, 284.3, 284.7, 353, 284.11
See application file for complete search history.

(56) References Cited

U.S. PATENT DOCUMENTS

| | | | | |
|---|---|---|---|---|
| 4,773,703 A | * | 9/1988 | Krugener | B60N 2/0284 297/284.11 X |
| 5,098,157 A | | 3/1992 | Surot | |
| 5,171,062 A | * | 12/1992 | Courtois | B60N 2/0284 297/284.11 |
| 5,384,946 A | | 1/1995 | Sundstedt et al. | |
| 5,564,785 A | | 10/1996 | Schultz et al. | |
| 5,836,647 A | * | 11/1998 | Turman | B60N 2/4228 297/353 X |
| 5,836,651 A | * | 11/1998 | Szerdahelyi | B60N 2/2222 297/353 X |
| 5,984,397 A | | 11/1999 | Dawson et al. | |
| 6,601,918 B2 | * | 8/2003 | Mattsson | B60N 2/0284 297/284.1 |
| 7,543,888 B2 | * | 6/2009 | Kuno | B60N 2/0232 297/353 |
| 7,547,068 B2 | * | 6/2009 | Davis | B60N 2/2222 297/353 X |
| 7,669,929 B2 | * | 3/2010 | Simon | B60N 2/0224 297/284.11 |
| 7,686,394 B2 | * | 3/2010 | Nishikawa | B60N 2/2222 297/353 X |

(Continued)

FOREIGN PATENT DOCUMENTS

EP         0592273 A2    4/1994

*Primary Examiner* — Rodney B White
(74) *Attorney, Agent, or Firm* — Vichit Chea; Price Heneveld LLP (57) ABSTRACT

A vehicle seat includes a cushion and a seatback coupled with the cushion. At least one of the cushion and the seatback includes a base and an extension portion moveable along an axis toward and away from the base, an expandable fabric member coupled between the base and the extension portion, and an expandable support structure positioned on an interior of the expandable fabric member.

20 Claims, 5 Drawing Sheets

(56) References Cited

U.S. PATENT DOCUMENTS

| | | |
|---|---|---|
| 8,118,359 B2 | 2/2012 | Kyogoku et al. |
| 8,240,754 B2 | 8/2012 | Maier |
| 8,567,866 B2 * | 10/2013 | Carimati Di Carimate ............... A47D 1/008 297/353 X |
| 9,039,085 B2 * | 5/2015 | Aselage ............... B60N 2/0284 297/284.3 X |
| 2002/0113473 A1 * | 8/2002 | Knaus .................... A47C 1/023 297/284.11 |
| 2005/0184569 A1 * | 8/2005 | Penley ..................... B60N 2/62 297/284.11 |
| 2006/0186719 A1 * | 8/2006 | Davis ................... B60N 2/2222 297/353 |
| 2008/0157577 A1 * | 7/2008 | Lindsay ............... B60N 2/0224 297/284.11 |
| 2009/0174242 A1 * | 7/2009 | Kohl .................... B60N 2/0284 297/284.11 |
| 2016/0016488 A1 * | 1/2016 | Farooq ..................... B60N 2/20 297/353 X |

* cited by examiner

COLLAPSIBLE CAR SEATS TO INCREASE CARGO SPACE AND FLEXIBILITY

FIELD OF THE INVENTION

The present invention generally relates to an adjustable seat for a vehicle. In particular, a vehicle seat includes an extendable portion with an expanding insert to fill a gap that expands with movement of the extendable portion.

BACKGROUND OF THE INVENTION

In various types and sizes of vehicles, interior space, cargo space, and ease of ingress/egress can be primary concerns for customers and users. In general, vehicle seats of a particular size are often desired for comfort purposes, but at the potential sacrifice of interior or cargo space and, in some instances, ease of entry. For example, many different solutions have been developed in an attempt to facilitate entry by passengers into third-row seats, which often include navigating past a second-row of seats adjacent the door nearest to the third row. Most of these methods involve moving the second-row seats, which is often done manually and, in many instances, still requires climbing or the like to reach the desired seat. Still further, space within a vehicle is often taken up by seats that are unoccupied. By being able to decrease the size of a vehicle seat, such space can be regained for comfort or cargo purposes, or to facilitate entry to a third row seat.

SUMMARY OF THE INVENTION

According to one aspect of the present disclosure, a vehicle seat includes a cushion and a seatback coupled with the cushion. At least one of the cushion and the seatback includes a base and an extension portion moveable along an axis toward and away from the base, an expandable fabric member coupled between the base and the extension portion, and an expandable support structure positioned on an interior of the expandable fabric member.

According to another aspect of the present disclosure, a vehicle includes a first seat in an interior of the vehicle and including a cushion and a seatback coupled therewith. At least one of the cushion and the seatback has a base and an extension portion moveable along an axis toward and away from the base, an expandable member coupled between the base and the extension portion, and an expandable support structure within an interior of the expandable member.

According to another aspect of the present disclosure, a vehicle seat includes a cushion and a seatback coupled with the cushion. At least one of the cushion and the seatback includes a base and an extension portion moveable along an axis toward and away from the base to respectively close and open a gap therebetween. A fabric member is coupled between the base and the extension portion and is expandable over the gap. A support structure is positioned on an interior of the fabric member and is expandable to maintain a generally even support distribution along the expandable fabric member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
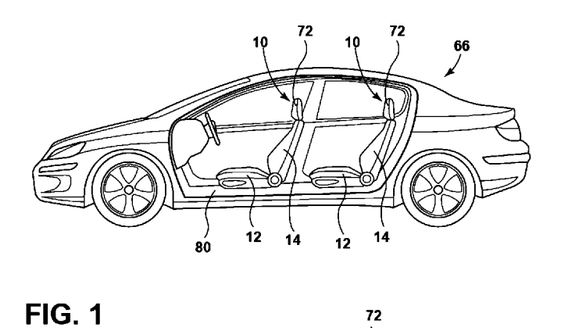
FIG. 1 is a side view of a vehicle including a plurality of vehicle seats according to an aspect of the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-4, reference numeral 10 generally designates a vehicle seat. Seat 10 includes a cushion 12 and a seatback 14 coupled with the cushion 12. At least one of the cushion 12 and the seatback 14 includes a base 16 and an extension portion 18 movable along an axis 20 toward and away from the base 16. An expandable fabric member 22 is coupled between the base 16 and the extension portion 18, and an expandable support structure 24 is positioned on an interior 26 of the expandable fabric member 22.

Figure 2:
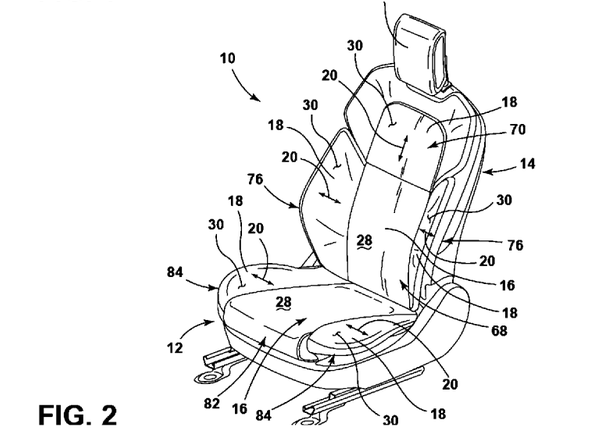
FIG. 2 is a perspective view of a vehicle seat according to an aspect of the present disclosure.
Figure 3:
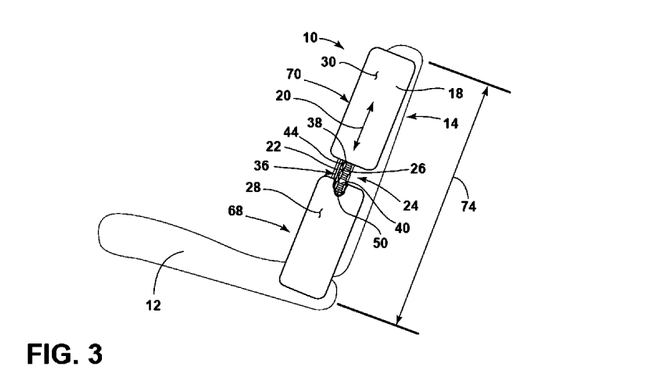
FIG. 3 is a schematic side view of the vehicle seat of FIG. 2.
Figure 4:
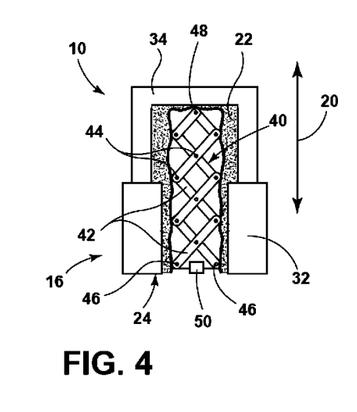
FIG. 4 is a simplified, partial cutaway view of a base and extension portion of the vehicle seat of FIG. 2.

As shown in FIGS. 2-4, wherein base 16 and extension portion 18 are shown as forming respective portions of seatback 14, vehicle seat 10 can include a seat frame 32 and an extension frame 34 that support respective portions of the seat cover stock 28,30. In the example of FIG. 2, the base 16 and extension portions 18 are shown as being present in the seatback; however, variations can include multiple bases 16 and extension portions 18 in both the cushion 12 and/or seatback 14, as discussed further below. As shown, movement of extension portion 18 away from base 16 along axis 20 includes movement and/or extension of extension frame 34 away from seat frame 32 and corresponding movement of the extension cover stock portion 30 away from the base cover stock portion 28. Such movement causes expansion of a gap 36 between extension portion 18 and base 16, such as between extension cover stock 30 and base cover stock 28. The above-mentioned expandable fabric member 22 is, accordingly, affixed at respective ends thereof with base 16 and extension portion 18, such as by coupling respectively with base cover stock portion 28 and extension cover stock portion 30.

The expandable nature of fabric member 22 can allow for an initial, unextended configuration of fabric member 22 to correspond with a non-extended position of extension portion 18 with respect to base 16, which may result in no gap being present or only a small gap 36 defined between extension portion 18 and base 16. As extension portion 18 moves away from base 16 along axis 20, fabric member 22 extends, such as by stretching thereof, to cover gap 36 as it expands. By structuring fabric member 22 of a generally resiliently expandable fabric, the portion of fabric member 22 covering gap 36 can remain taut, including when extension portion 18 is at an intermediate position with respect to base 16. In general, fabric member 22 may be of any resiliently stretchable fabric, including various fabrics with interwoven elastic material, as well as polymeric fabrics, including various types of nylon, spandex, or the like. Various types of stretchable fabrics, including various mesh "spacer" fabrics are available from the Muller Textile Company of Wiehl, Germany. In various embodiments, fabric member 22 can be coupled with extension portion 18 and base 16 along portions thereof immediately adjacent gap 36 or can overlap or extend internally from portions of base cover stock 28 and extension cover stock 30, for example.

As shown in FIGS. 3 and 4, an actuation mechanism 40 can be coupled between base 16 and extension portion 18 to drive movement of extension portion 18 away from base 16 along axis 20. As shown, the actuation mechanism 40 may be in the form of a scissor-jack mechanism including a plurality of arms 42 coupled together and a plurality of hinge points 44. As illustrated in FIG. 3, portions of the scissor jack actuation mechanism 40 can contact an interior surface 26 of fabric member 22 at various points therealong. For example, the hinge points 44 can define at least some of such points of contact such that the expanding movement of actuation mechanism 40 maintains a generally uniform distribution of such points of contact by the distribution of hinge points 44. In another example, arms 42 can define the points of contact with the interior 26 of fabric member 22 or an additional plurality of elements can be included between interior surface 26 and actuation mechanism. In such a mechanism, base ends 46 are fixed along axis 20 and slidable toward and away from each other in a direction normal thereto. In this manner, movement of base ends 46 toward each other can cause lengthening of mechanism 40 and, accordingly, movement of extension portion 18 away from base 16 by coupling with extending end 48. The movement of base ends 46 toward each other can be driven by an actuator 50 coupled therebetween. Such an actuator 50 can take various forms including a screw-driven actuator, or other motor-driven actuators, as well as pneumatic or hydraulic actuators. Movement of extension portion 18 back toward base 16 along axis 20 can similarly be achieved by movement of base ends 46 away from each other, thereby shortening mechanism 40 and drawing extension portion 18 closer to base 16 by coupling with extending ends 48.

Figure 5:
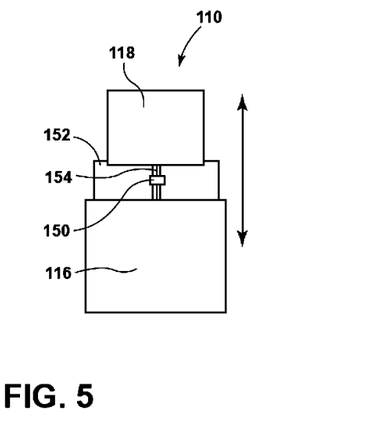
FIG. 5 is a simplified, partial cutaway view of a base and extension portion of a further variation of the vehicle seat of FIG. 2.

As shown in FIG. 5, extension portion 118 can be positioned in front of an inset face 152 that can extend through the area defined by gap 136 when extension portion 118 is moved away from base 116. In such an embodiment, a fabric member may extend within gap 136 between base 116 and extension portion 118 to cover all or a portion of face 152. Alternatively, the fabric member 22 may be omitted such that inset face 152 is visible within gap 136. In either variation one or more slots 154 may be present within face 152 to allow for mounting of extension portion 118.

Figure 6:
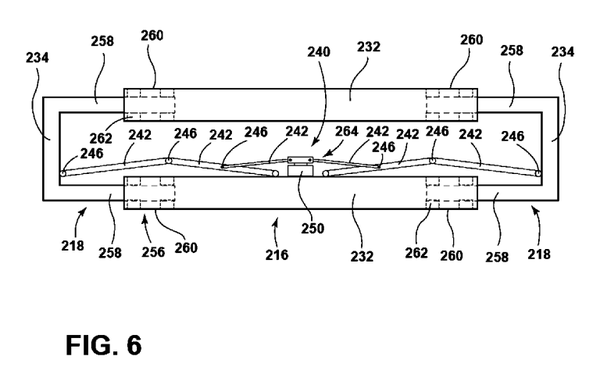
FIG. 6 is a view of an extension mechanism useable in connection with a variation of the vehicle seat of FIG. 2.

As shown in the embodiment depicted in FIG. 6, extension portion 218 may be mounted with base 216 using a telescoping mounting structure 256 including an extending arm 258 that is coupled with or forms a part of extension frame 234. As shown, extending arms 258 are received within outer supports 260 that are similarly integral with or coupled to seat frame 232. In particular, extending arms 258 may be received within corresponding bearings and/or bushings 262 positioned within outer support 260 to facilitate a slidable, telescoping arrangement of extending arms 258 with respect to outer supports 260.

As further shown in FIG. 6, an alternative actuation mechanism 240 can include an umbrella arm mechanism 264 that includes a plurality of arms 242 coupled together at a plurality of hinge points 244 such that movement of base ends 246 toward or away from each other can cause movement of extending end 248, which is coupled to extension portion 218. In a manner similar to that which is discussed above, an actuator 250 can be coupled with one or more of base ends 246 to cause movement of base ends 246 away from each other. As further illustrated in this embodiment, as well as the embodiment depicted in FIG. 3, a single actuator 250 can be used to drive movement of opposite extension portions 218.

As shown in the figures, the above-described base 16 and extension portion 18 can be incorporated into vehicle seat 10 in one or more of a plurality of possible locations, extension portion 18 corresponding to one of various portions or areas of seat 10, to allow for a change in the overall size or configuration of seat 10 and/or to provide for adjustment of the positioning of such a feature. Both of these adjustment modes can be used to provide for additional space within vehicle 66, such as to provide for additional comfort to passengers in other, adjacent vehicle seats or to allow improved maneuvering within vehicle 66, such as during ingress or egress. In one embodiment, such as that illustrated in FIGS. 1 and 2, the base 16 may be positioned within seatback 14 so as to include or otherwise define the lower-central lumbar area 68 of seatback 14. In this manner, one extension portion 18 can be positioned vertically above base 16 so as to define an upper-central thoracic 70 that may further include a headrest 72 coupled therewith. In this arrangement, axis 20 is a generally vertical axis such that movement of extension portion 18 toward and away from base 16 adjusts (i.e. increases or decreases) the height 74 of seat 10. Additionally, seat 10 can optionally include one or more additional extension portions 18 arranged laterally of lumbar area 68 to define the bolster areas 76 of seatback 14. In this manner, the driver's seat 80 (or other front seat) of vehicle 66 can be adjusted in both height 74 and width 78, allowing for customization of the vehicle seat 10, depending on the size of an occupant. In this manner, movement of corresponding extension portions 18 toward and away from base 16 can adjust a width 78 of seatback 14. In further variations, the extension portions 18 within bolsters 76 and/or thoracic area 70 can be angled or arced relative to base 16 such that movement thereof can also adjust the thickness of seatback 14. In a further aspect, vehicle 66 may be an autonomous vehicle and the above-described adjustments of the seatback height 74, width 78, and thickness can be used to reduce the overall size of seatback 14, in particular when vehicle 66 is in an autonomous driving mode with driver's seat 80 unoccupied.

In a similar manner, the above-described base 16 and/or an additional base 16 may be positioned within cushion 12 such that base 16 includes a central cushion area 82. In such an arrangement, extension portion 18 can be included laterally of base 16 to allow for adjustment of the width 78 of cushion 12. In the example of FIG. 2, the extension portion 18 within cushion 12 can include a cushion bolster area 84, including both cushion bolsters 84 on opposite sides of central area 82, with separate extension portions 18 corresponding with each cushion bolster 84. This arrangement can allow for outward movement of cushion bolsters 84 with respect to the middle 82 of cushion 12 to accommodate occupants of various sizes and/or to allow for changes in the amount of space occupied by cushion 12. This arrangement can be incorporated into the above-described arrangement of seat 10 in the driver's seat 80 position and can have similar functionality with respect to an autonomous variation of vehicle 66.

Figure 7:
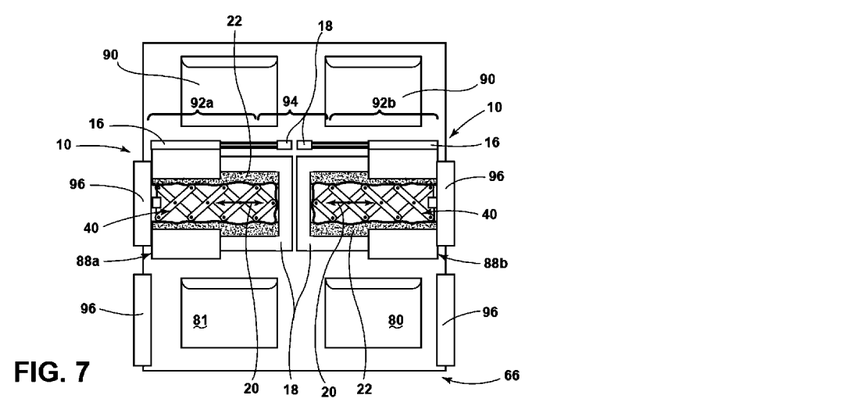
FIG. 7 is a top schematic view of a vehicle interior using two seats according to a variation of the seat depicted in FIG. 2 as second-row seats in a three row seating arrangement.
Figure 8:
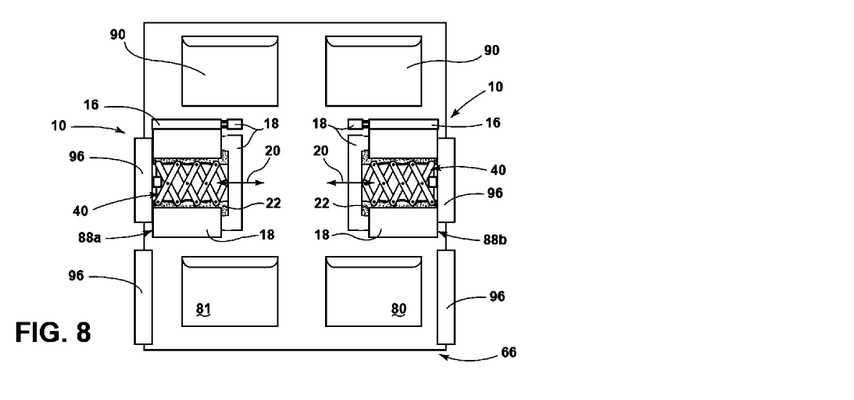
FIG. 8 is the top schematic view of FIG. 7 with the second-row seats in a retracted position.

As shown in FIGS. 7-10, variations of the above-described vehicle seat 10 can be used in the position of a second-row seat in a three-row seating arrangement. As illustrated in FIG. 7, second-row seats 88a and 88b can be configured with laterally-extending extension portions 18 in both the seatback 14 and cushions 12 thereof. In the illustrated arrangement, seats 88a and 88b are mirror-images of each other such that the extension portions 18 can define center seat areas 94 adjacent side seat areas 92. In this manner, at least three seating positions are defined between second-row seats 88a and 88b, and an occupant may sit in a middle position over one or two center seat areas 94 included on extension portions 18 such that the middle position is defined in approximate half-portions by the respective center seat areas 94. In this arrangement, the extension portions 18 can be withdrawn into bases 16, as shown in FIG. 8, to allow for easy access to the third row seats 90 within the vehicle 66. Although in the example shown each of the second-row seats 88a and 88b includes extension portion 18 defining respective portions of the center seat areas 94 within both the cushion 12 and the seatback 14, a variation can include extension portions 18 within only seatback 14 to provide a passage for a user climbing over the respective cushions 12 that remain in place within second-row seats 88a and 88b.

Figure 9:
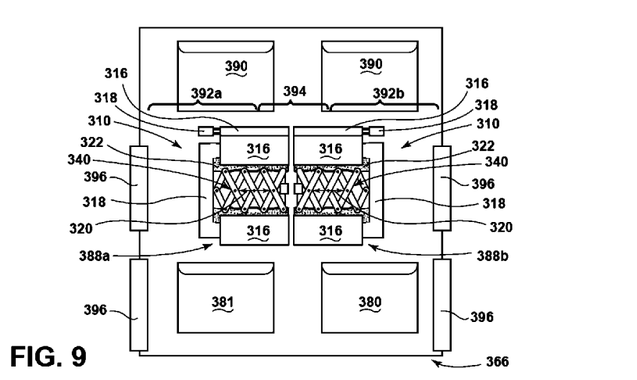
FIG. 9 is a top schematic view of a vehicle interior using two seats according to a further variation of the seat depicted in FIG. 2 as second-row seats in a three row seating arrangement.
Figure 10:
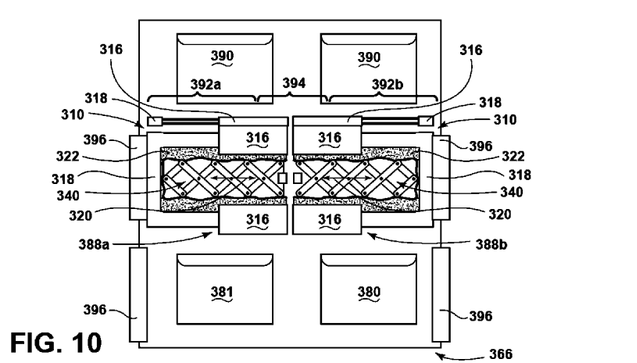
FIG. 10 is the top schematic view of FIG. 9 with the second-row seats in an extended position.

In the variation shown in FIGS. 9 and 10, the second-row seats 388a and 388b can include bases 316 that define center seat area 394 as well as portions of side seat areas 392a, 392b, with extension portions 318 providing additional, outer areas of side seating areas 392. In this arrangement, extension portions 318 can be extended such that second-row seats 388a and 388b extend generally across a width of a vehicle 366 with extension portions 318 disposed outwardly adjacent doors 396, as shown in FIG. 9. To provide for easy access to the third row seats 390, extension portions 318 can be respectively withdrawn into bases 316 and away from doors 396 such that the respective third row seats 390 can be accessed using the additional space provided adjacent to doors 396 by withdrawal of extension portions 318. Similar to the arrangement discussed above with respect to FIGS. 7 and 8, the second-row seats 388a and 388b shown in FIGS. 9 and 10 can include extension portions 318 within seatback 314, as well as, optionally, within cushion 312.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
   a cushion; and
   a seatback coupled with the cushion;
   wherein at least one of the cushion and the seatback includes:
   a base and an extension portion moveable along an axis toward and away from the base to respectively close and open a gap therebetween;
   an expandable fabric member coupled to the base and the extension portion to expand and retract with movement of the extension portion away from and toward the base to extend over the gap in a substantially planar condition; and
   an expandable support structure positioned on an interior side of the expandable fabric member.

2. The vehicle seat of claim 1, wherein:
   a movement of the extension portion along the axis away from the base defines a gap between the extension portion and the base; and
   the expandable fabric member extends over the gap during the movement.

3. The vehicle seat of claim 2, wherein the expandable support structure defines a plurality of contact points with the expandable fabric member and expands within the gap during the movement such that the contact points maintain a generally even distribution along the expandable fabric member when extended.

4. The vehicle seat of claim 1, wherein the expandable support structure includes a scissor-jack mechanism.

5. The vehicle seat of claim 1, wherein the expandable support structure includes an umbrella arm mechanism.

6. The vehicle seat of claim 1, further including a telescoping mounting structure coupling the extension portion to the base.

7. The vehicle seat of claim 1, further including an actuator driving movement of the extension portion relative to the base.

8. The vehicle seat of claim 1, wherein:
the base includes a lumbar area of the seatback and the extension portion includes a thoracic area of the seatback disposed above the lumbar area; and
a movement of the extension portion away from the base increases a height of the seatback.

9. The vehicle seat of claim 1, wherein:
the base includes a lumbar area of the seatback and the extension portion includes a bolster area of the seatback disposed laterally of the lumbar area; and
a movement of the extension portion toward the base decreases a width of the seatback.

10. The vehicle seat of claim 1, wherein:
the base includes a central area of the cushion and the extension portion includes a bolster area of the cushion disposed laterally of the central area; and
a movement of the extension portion toward the base decreases a width of the cushion.

11. The vehicle seat of claim 10, wherein the base is a first base and the extension portion is a first extension portion, the seat further including:
a second base including a lumbar area of the seatback and a second extension portion including a bolster area of the seatback disposed laterally of the lumbar area;
wherein a movement of the second extension portion toward the second base decreases a width of the seatback.

12. The vehicle seat of claim 1, wherein:
the base includes a side seat area of the cushion and the extension portion includes at least a portion of a middle seat area of the cushion disposed laterally of the side seat area; and
a movement of the extension portion toward the base decreases a width of the cushion.

13. A vehicle, comprising:
a first seat in an interior of the vehicle and including a cushion and a seatback coupled therewith;
wherein at least one of the cushion and the seatback has:
a base and an extension portion moveable along an axis toward and away from the base to respectively close and open a gap therebetween;
an expandable fabric member coupled to the base and the extension portion to expand by stretching with movement of the extension portion away from the base to extend over the gap in a substantially planar condition and to retract with movement of the extension portion toward the base; and
an expandable support structure positioned on an interior side of the expandable fabric member.

14. The vehicle of claim 13, wherein:
the first seat is a front seat of the vehicle.

15. The vehicle of claim 14, wherein the first seat is further a driver seat in autonomous vehicle, the vehicle further comprising a controller causing movement of the extension portion toward the base when the vehicle is in an autonomous driving mode.

16. The vehicle of claim 13, wherein:
the extension portion is a first extension portion;
the base includes a lumbar area of the seatback and the first extension portion includes a thoracic area of the seatback disposed above the lumbar area;
a movement of the first extension portion away from the base increases a height of the seatback;
the first seat further includes a second extension portion including a bolster area of the seatback disposed laterally of the lumbar area; and
a movement of the second extension portion toward the base decreases a width of the seatback.

17. The vehicle of claim 13, wherein:
the vehicle defines a three-row seating arrangement;
the first seat is a second-row passenger seat;
the base is a first base and the extension portion is a first extension portion;
the first base includes a side seat area of the cushion and the first extension portion includes at least a portion of a middle seat area of the cushion disposed laterally of the side seat area;
a movement of the first extension portion toward the first base decreases a width of the cushion;
the first seat further includes a second base including a side seat area of the seatback and a second extension portion including a middle seat area of the seatback disposed laterally of the side seat area of the seatback; and
a movement of the second extension portion toward the second base decreases a width of the seatback.

18. The vehicle of claim 17, further including a second seat that is a mirror-image of the first vehicle seat such that two middle seat areas are defined on respective adjacent first and second extension portions of the first and second vehicle seat.

19. The vehicle of claim 13, wherein:
the vehicle defines a three-row seating arrangement;
the first seat is a middle-row passenger seat positioned adjacent a door of the vehicle;
the extension portion is disposed laterally of the base and adjacent the door such that movement of the extension portion toward and away from the base moves the extension portion away from and toward the door, respectively.

20. A vehicle seat, comprising:
a cushion; and
a seatback coupled with the cushion;
wherein at least one of the cushion and the seatback includes:
a base and an extension portion moveable along an axis toward and away from the base to respectively close and open a gap therebetween;
a fabric member coupled to the base and the extension portion and expandable over the gap in a substantially planar condition; and
an expandable support structure positioned on an interior side of the fabric member in contact therewith to provide evenly distributed points of contact with the fabric member and to maintain a generally even support distribution along the expandable fabric member.

* * * * *